(12) United States Patent
Araki et al.

(10) Patent No.: US 6,368,127 B1
(45) Date of Patent: Apr. 9, 2002

(54) ROTARY CONNECTOR WITH LOCKING MECHANISM FOR PREVENTING ROTATION OF HOUSING PRIOR TO INSTALLATION ONTO STEERING DEVICE

(75) Inventors: Shunji Araki; Seishi Takahashi, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/934,280

(22) Filed: Aug. 21, 2001

(30) Foreign Application Priority Data

Aug. 25, 2000 (JP) ........................... 2000-255966

(51) Int. Cl.7 ............................................. M01R 3/00
(52) U.S. Cl. ........................................... 439/164; 439/15
(58) Field of Search ................................ 439/15, 164

(56) References Cited

U.S. PATENT DOCUMENTS 4,919,620 A * 4/1990 Yamaguchi et al. .......... 439/15
4,966,334 A * 10/1990 Bannai ....................... 242/460
5,171,157 A   12/1992 Bolen ......................... 439/164
5,936,215 A * 8/1999 Masuda et al. ............. 200/61.3

* cited by examiner

Primary Examiner—Tulsidas Patel
(74) Attorney, Agent, or Firm—Brinks Hofer Gilson & Lione (57) ABSTRACT

A rotary connector capable of preventing a locking key from projecting from a housing and eliminating dead space between the rotary connector and other vehicle-mounted parts. The rotary connector has a locking mechanism for a movable housing and a stationary housing, which is constituted of a guide hole bored in the movable housing, an operating part slidably stored in the guide hole, a part of which is projected from one open end of the guide hole to the outside, a locking key slidably stored in the guide hole, a part of which is projected from the other open end to the outside, a rotor snap (stopper) disposed opposite to the locking key, a first spring member set between the operating part and the locking key, a second spring member set between the locking key and the rotor snap, and a key engaging part provided on the stationary housing.

3 Claims, 7 Drawing Sheets

ROTARY CONNECTOR WITH LOCKING MECHANISM FOR PREVENTING ROTATION OF HOUSING PRIOR TO INSTALLATION ONTO STEERING DEVICE

BACKGROUND OF THE INVENTION

1. Field of the Invention

The invention relates to a rotary connector for electrically connecting an electric device disposed on the rotor side of a steering device and an electric device disposed on the stator side and particularly to the structure of a locking mechanism for preventing relative rotation of a housing prior to installation on a steering device.

2. Description of the Prior Art

A rotary connector has been mainly provided with a pair of housings disposed concentrically and connected to be relatively rotatable, and a flexible cable stored in a cable storing part formed between the paired housings to be wound and unwound, both ends thereof being led through to the outside. One housing is fixed to a steering column of a steering device, the other housing is fixed to a steering wheel, and both ends of the flexible cable are connected to an electric part provided on the steering column side and an electric part provided on the steering wheel side, respectively to be used as electric connecting means of an air bag system, a horn circuit and the like.

The winding amount and unwinding amount of the flexible cable, that is, the moving amounts of the movable housing from the neutral position in one direction and in the other direction to the stationary housing are both limited, and respectively set a little larger than the counterclockwise moving amount and the clockwise moving amount from the neutral position of the steering wheel. Accordingly, in installing the rotary connector on the steering device, it is necessary to strictly align the neutral position of the steering wheel with the neutral position of the rotary connector to prevent the occurrence of the disadvantage that the flexible cable is wound up in one direction or in the other direction by the steering wheel operation so that excessive tension is applied to the flexible cable to cause breakage. Accordingly, a rotary connector has been previously proposed, having a locking mechanism for locking a stationary housing and a movable housing set in a neutral position to the stationary housing to prevent rotation between both housings prior to installation onto a steering device, and automatically releasing locking between both housings with installation of the rotary connector onto the steering device to enable the movable housing to rotate with the steering wheel operation.

Figure 10:
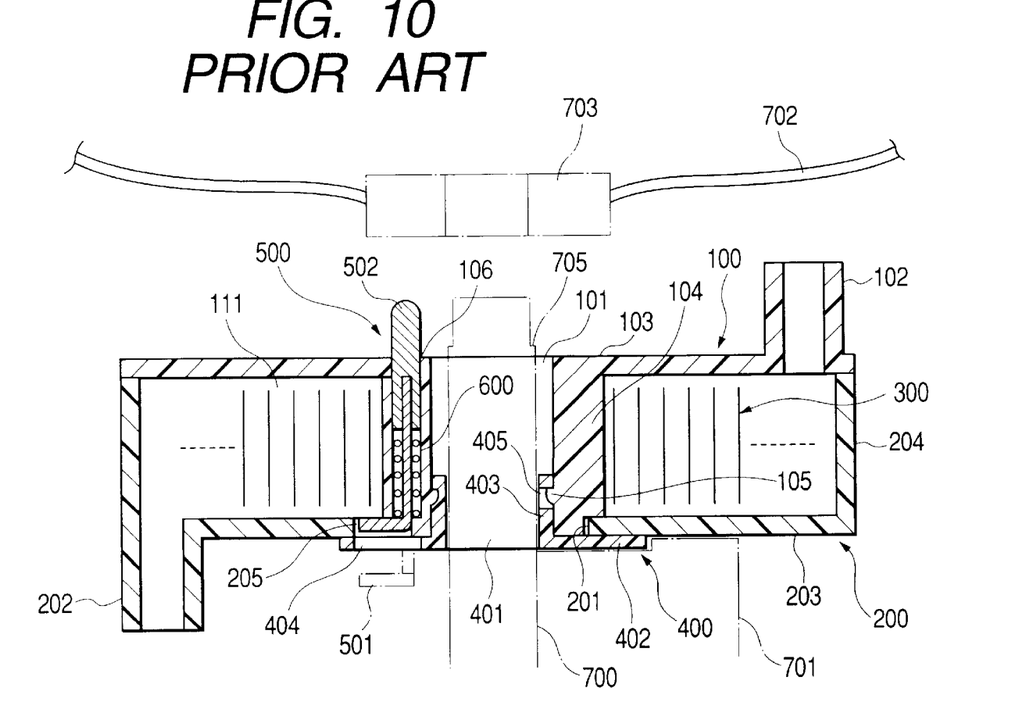
FIG. 10 is a sectional view of the rotary connector according to the prior art.
Figure 11:
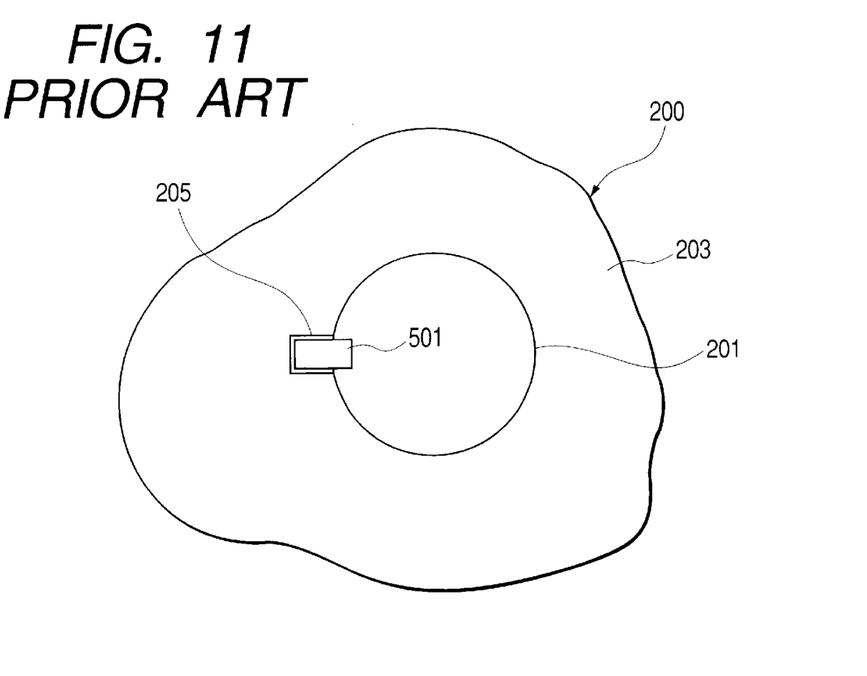
FIG. 11 is a bottom view of the principal part showing the engagement state of the locking key and the stationary housing provided on the rotary connector of FIG. 10.

FIG. 10 is a sectional view of this type of a rotary connector which has been known heretofore, and FIG. 11 is a bottom view of the principal part showing the engagement state of a locking key provided on the rotary connector of FIG. 10 with a stationary housing. In the drawings, the reference numeral 100 designates a movable housing, 200 a stationary housing, 300 a flexible cable, 400 a rotor snap, 500 a locking key structure, and 600 a spring member for urging the locking key mechanism 500 in one direction.

The movable housing 100 is constituted of a disc-like top plate 103 provided with a center hole 101 and a first conductor lead-through part 102 formed for fixing one end of the flexible cable 300, and a first inner cylinder 104 suspended from the inner peripheral edge of the top plate 103. A snap claw 105 for snap-joining the rotor snap 400 is formed on the inner surface of the first inner cylinder 104. The first inner cylinder 104 is provided with a guide hole 106 bored in a part thereof to penetrate from the tip thereof to the surface of the top plate 103.

On the other hand, the stationary housing 200 is constituted of a disc-like base plate 203 provided with a center hole 201 having such a diameter as to pass the first inner cylinder 104 therethrough, and a second conductor lead-through part 202 formed for fixing the other end of the flexible cable 300, and an outer cylinder 204 raised from the outer peripheral part of the base plate 203. The base plate 203 and the outer cylinder 204 are joined and united in a body by heat caulking or the like. The inner peripheral edge of the base plate 203, as shown in FIG. 11, has a key engaging part 205 recessed for engaging with the tip of the locking key 501 constituting the other part of the locking key structure 500.

The flexible cable 300 is spirally wound and stored in an annular cable storing part 111 formed by the concentric combination of the moving housing 100 with the stationary housing 200. One end of the flexible cable 300 is wired and fixed in the first conductor lead-through part 102 to be connected to a lead wire or an external connector not shown in the first conductor lead-through part 102, and electrically led through to the outside of the moving housing 100. The other end of the flexible cable 300 is wired and fixed in the second conductor lead-through part 202 to be connected to a lead wire or an external connector not shown in the second conductor lead-through part 202, and electrically led through to the outside of the stationary housing 200. The constitution of the flexible cable and the connecting structure of the flexible cable and the lead wire or the external connector are known and not the gist of the present invention, so the description is omitted.

The rotor snap 400 is intended to rotatably connect the movable housing 100 to the stationary housing 200, and constituted of a doughnut-like locking plate 402 provided with a center hole 401 having a diameter smaller than the inside diameter of the first inner cylinder 104 and having an outside diameter smaller than the outside diameter of the base plate 203, and a second inner cylinder 403 raised from the inner peripheral part of the locking plate 402. A portion of the locking plate 402 opposite to the guide hole 106 is provided with an escape hole 404 for preventing the locking key 501 from colliding with the locking plate 402, and the second inner cylinder 403 has an engagement hole 405 for engaging with the snap claw 105 formed on the first inner cylinder 104.

The locking key structure 500 is formed by the metal locking key 501, the tip of which is bent L-shaped, and a resin-made operating part 502 secured to the tail end of the locking key 501. A pair of snap joining units (not shown) are formed on the connecting part of the respective members 501, 502. After the operating part 502 and the spring member 600 are stored in the guide hole 106 bored in the movable housing 100, the tail end of the locking key 501 is inserted in the guide hole 106 from below the guide hole 106, and the snap joining means (not shown) formed on the tail end of the locking key 501 and the snap joining means (not shown) formed on the tail end of the operating part 502 are connected to thereby integrally connect the locking key 501 and the operating part 502 to each other.

At the time of shipping, the position in the rotating direction of the movable housing 100 is adjusted to the neutral position to the stationary housing 200, and the locking key 501 is engaged with the key engaging part 205 formed on the base plate 203 of the stationary housing 200. The tip of the operating part 502 is projected outward from the top plate 103 by the elastic force of the spring member 600.

The thus constructed rotary connector is, as shown in FIG. 10, installed on a steering device by passing a steering shaft 700 through a central through hole of the rotary connector, aligning the steering shaft 700 with the neutral position of the stationary housing 200, then fixing the stationary housing 200 to the steering column 701, fitting a steering wheel 702 to the steering shaft 700, and connecting the steering wheel 702 and the movable housing 100 to each other. The steering wheel 702 is mounted on the steering shaft 700 by passing the steering shaft 700 through a through hole 704 bored in the central part of a steering wheel hub 703 and bringing one side of the steering wheel hub 703 into contact with an engaging stepped part 705 formed on the steering shaft 700, and in that case, the steering wheel hub 703 abuts on the operating part 502 of the locking key structure 500 prior to abutting on the engaging stepped part 705 to force the operating part 502 into the guide hole 106 against the elastic force of the spring member 600.

The locking key structure 500 has the locking key 501 and the operating part 502 integrated with each other, so that the locking key 501 is also moved for the forced amount of the operating part 502. In the moving process, the engagement of the locking key 501 with the key engaging part 205 formed on the stationary housing 200 is released so that the movable housing 100 can be rotated to the stationary housing 200. In the stage where one side of the steering wheel hub 703 abuts on the engaging stepped part 705 formed on the steering shaft 700, as indicated by a one-dot chain line in FIG. 10, the tip of the locking key 501 is passed through the escape hole 404 bored in the locking plate 402 of the rotor snap 400 and projected to the outside of the rotor snap 400.

As described above, the conventional rotary connector with the locking mechanism has the problem that when the steering wheel 702 is mounted on the steering shaft 700, the steering wheel hub 703 presses the operating part 502 so that the tip of the locking key 501 is projected to the outside of the rotor snap 400, resulting in the disadvantage that other vehicle-mounted parts cannot be disposed in a portion contacting the rotor snap 400, so the portion becomes dead space to cause the difficulty of designing the periphery of the steering device in an automobile.

Since the rotary connector has the locking key 501 and the operating part 502 integrated with each other so that the locking key 501 is also moved for the forced amount of the operating 502, the projection amount of the locking key 501 from the rotor snap 400 varies depending on the setting errors of the rotary connector and the steering wheel handle 702 to the steering shaft 700. On the other hand, the dimensions of the dead space preset between the rotary connector and the other on-vehicle part vary depending on the setting errors of the rotary connector and other vehicle-mounted parts to the steering shaft 700. Accordingly, in the case of some setting errors of the rotary connector and the steering wheel 702 to the steering shaft 700 and some setting errors of the rotary connector and other vehicle-mounted parts, the locking key 501 abuts on other vehicle-mounted parts set through the dead space, resulting in the risk of causing the disadvantage such as generation of abnormal sound.

SUMMARY OF THE INVENTION

The present invention has been made in order to overcome the above disadvantages of the prior art and provides a rotary connector which may eliminate the dead space between the rotary connector and other vehicle-mounted parts by preventing projection of a locking key from a housing, and will not cause generation of abnormal sound to be excellent in reliability.

According to a first aspect of the present invention, a rotary connector includes movable and stationary housings disposed concentrically and connected to be relatively rotatable, a flexible cable stored to be wound and unwound in an annular cable storing part formed between two housings, and a locking mechanism provided between the movable and stationary housings, the locking mechanism has a guide hole bored in the movable housing, an operating part slidably stored in the guide hole, a part of which is projected from one open end of the guide hole to the outside, a locking key slidably stored in the guide hole, a part of which is projected from the other open end of the guide hole to the outside, a stopper disposed opposite to the locking key, a first spring member set between the operating part and the locking key, a second spring member set between the locking key and the stopper, and a key engaging part with which the locking key provided on the stationary housing is removably engaged, and when the operating part is forced into the guide hole, the locking key is subjected to external force corresponding to a difference between the elastic force of the first spring member and the elastic force of the second spring member and moved to the stopper side, thereby releasing the engagement of the locking key with the key engaging part, and after the locking key is forced to abut on the stopper, only the first spring member is elastically deformed to force the operating part into the guide hole.

The operating part and the locking key are thus constituted as independent separate bodies, the first spring member is set between the operating part and the locking key, and the second spring member is set between the locking key and the stopper, whereby when the operating part is forced into the hole by a steering wheel hub, external force corresponding to a difference between the elastic force of the first spring member and the elastic force of the second spring member is applied to the locking key so that the locking key is pushed down in the pressing direction of the operating part to release the engagement of the locking key with the key engaging part, thereby enabling relative rotation between the movable housing and the stationary housing. When the operating part is further pressed under such a condition, the locking key abuts on the stopper to prevent the locking key from projecting to the outside. Accordingly, it is not necessary to provide dead space between the rotary connector and other vehicle-mounted parts, and further the locking key is kept from abutting on other vehicle-mounted parts to generate abnormal sound so as to facilitate designing the periphery of a steering device. Further, after the locking key abuts on the stopper, the operating part is separately forced into the guide hole against the elastic force of the first spring member, so that setting errors of the rotary connector and the steering wheel to the steering shaft can be absorbed by the elastic deformation of the first spring member not to cause any special problem.

According to another aspect of the invention, the movable housing to be used includes a disc-like top plate having a center hole, and an inner cylinder suspended from the inner peripheral edge of the top plate, the stationary housing to be used includes a base plate having a center hole penetrating the inner cylinder and an outer cylinder raised from the outer peripheral edge of the base plate, the inner cylinder is provided with the guide hole penetrating from the tip thereof to the surface of the top plate, and the key engaging part is formed on the base plate.

In the rotary connector having the thus constructed housing, the inner cylinder is provided with the guide hole bored to penetrate from the tip thereof to the surface of the top plate, whereby large installation space for the locking mechanism can be taken, and the locking mechanism including the operating part, the locking key and the first and second spring members can be easily set.

According to another aspect of the invention, as the stopper, used is a rotor snap rotatably connecting the movable and stationary housings to each other.

When the rotor snap is thus used as the stopper for bearing the second spring member, the number of the parts can be decreased so that the constitution of the rotary connector can be simplified and the manufacturing cost can be reduced.

BRIEF DESCRIPTION OF THE DRAWINGS

Preferred embodiment of the present invention will be described in detail based on the followings, wherein.

DESCRIPTION OF THE PREFERRED EMBODIMENT

Figure 1:
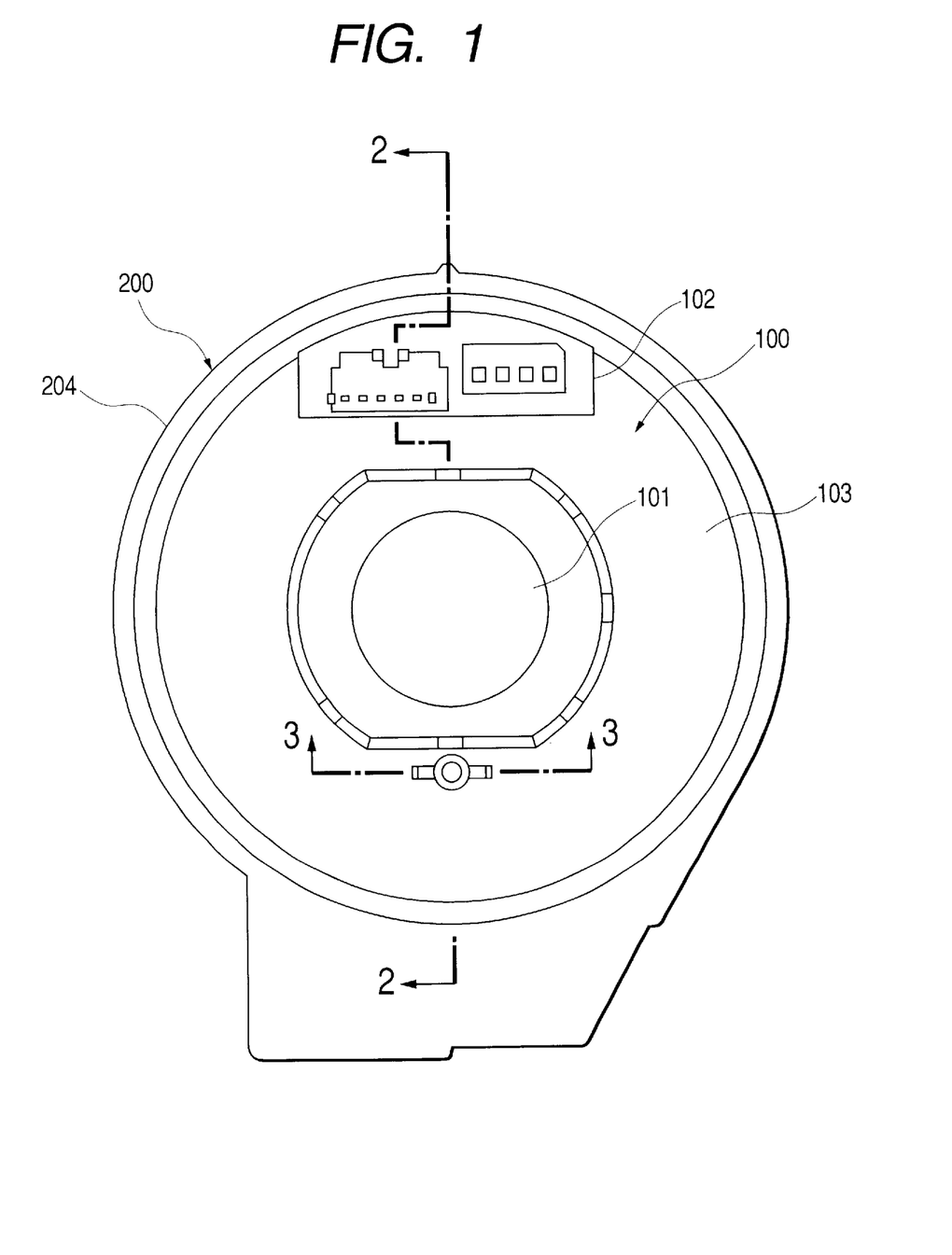
FIG. 1 is a plan view of the rotary connector according to the embodiment.
Figure 2:
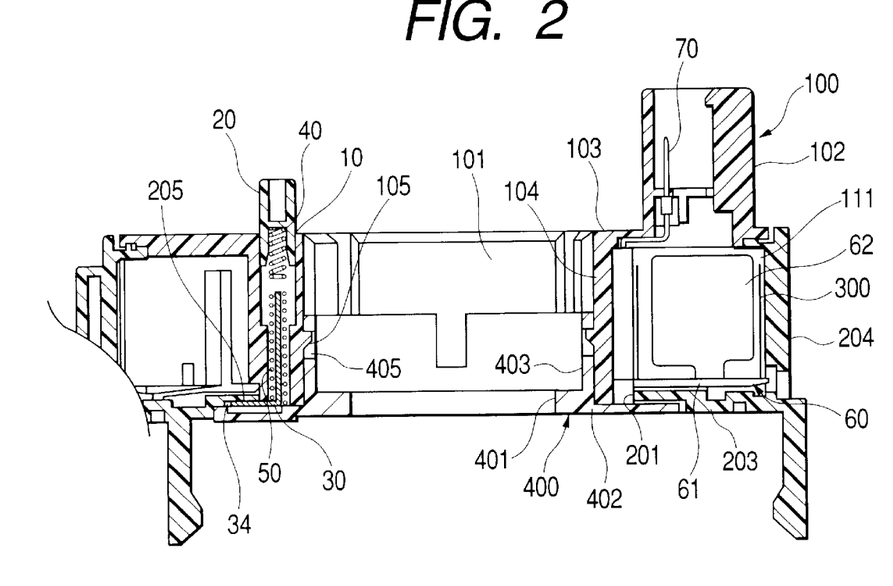
FIG. 2 is a sectional view of the rotary connector, taken a long the line 2—2 of FIG. 1.
Figure 3:
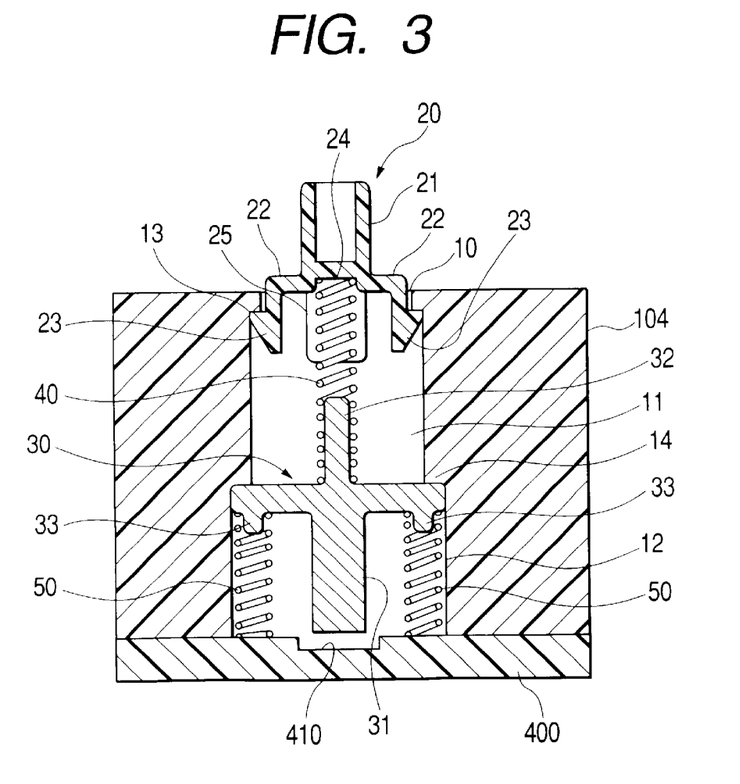
FIG. 3 is a sectional view of the rotary connector, taken along the line 3—3 of FIG. 1.
Figure 4:
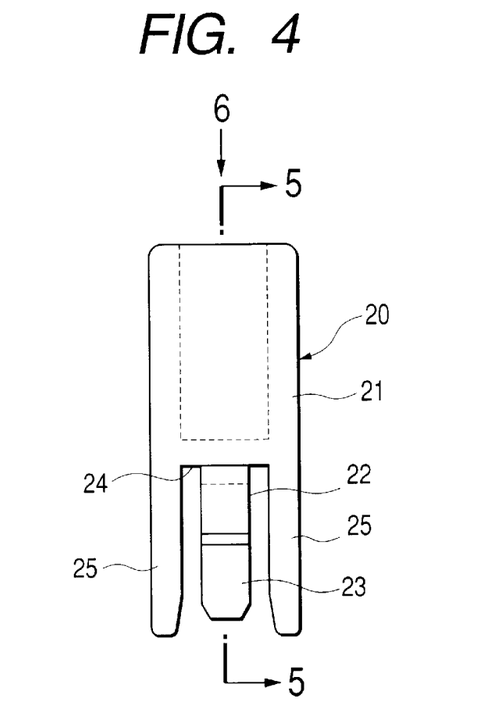
FIG. 4 is a front view of the operating part.
Figure 5:
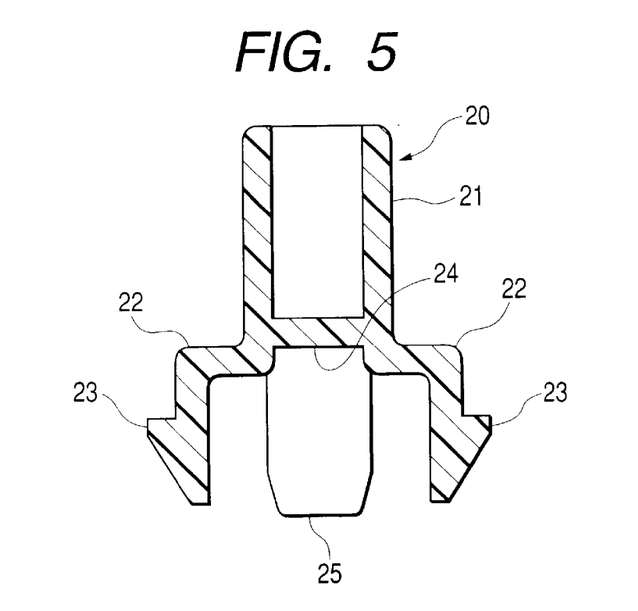
FIG. 5 is a sectional view of the operating part, taken along the line 5—5 of FIG. 4.
Figure 6:
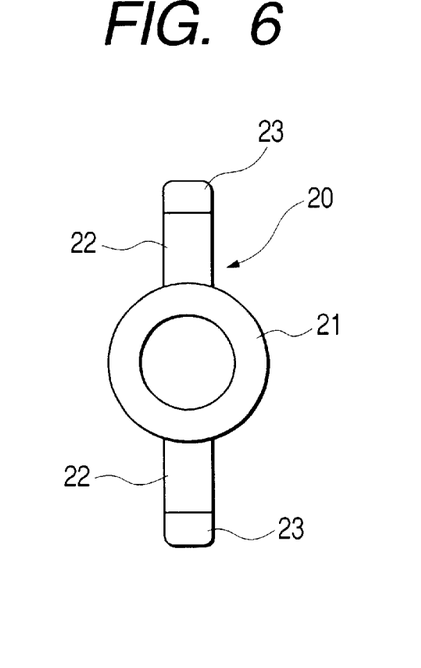
FIG. 6 is a side view of the operating part, seen from the direction of an arrow 6 in FIG. 4.
Figure 7:
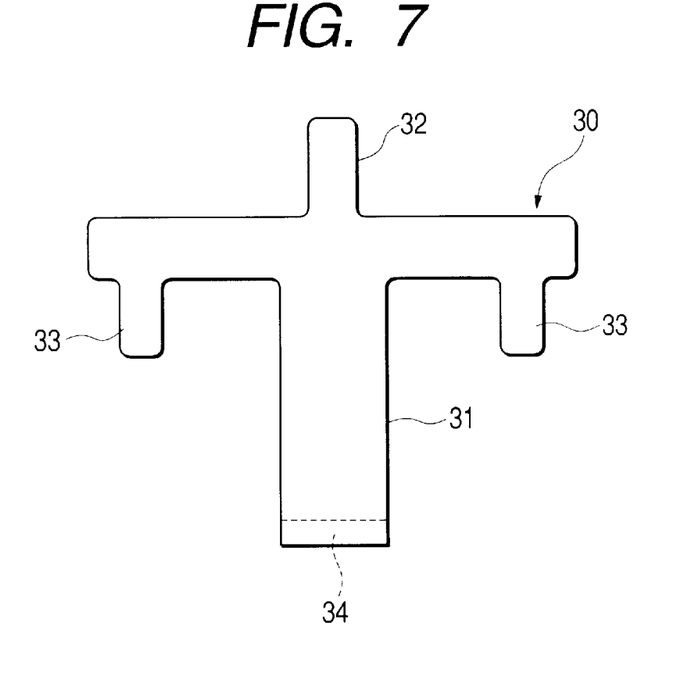
FIG. 7 is a front view of the locking key.
Figure 8:
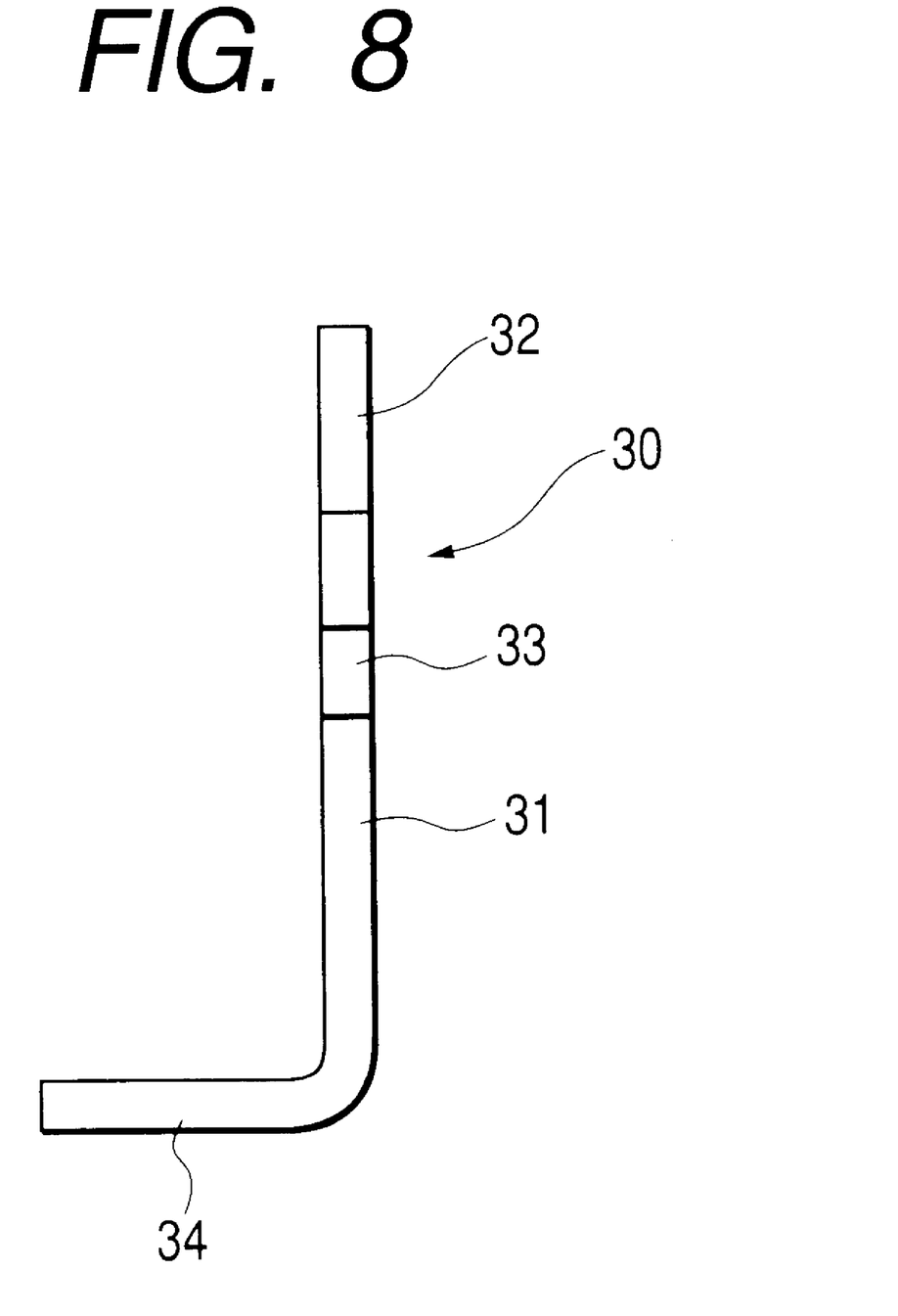
FIG. 8 is a side view of the locking key.
Figure 9A:
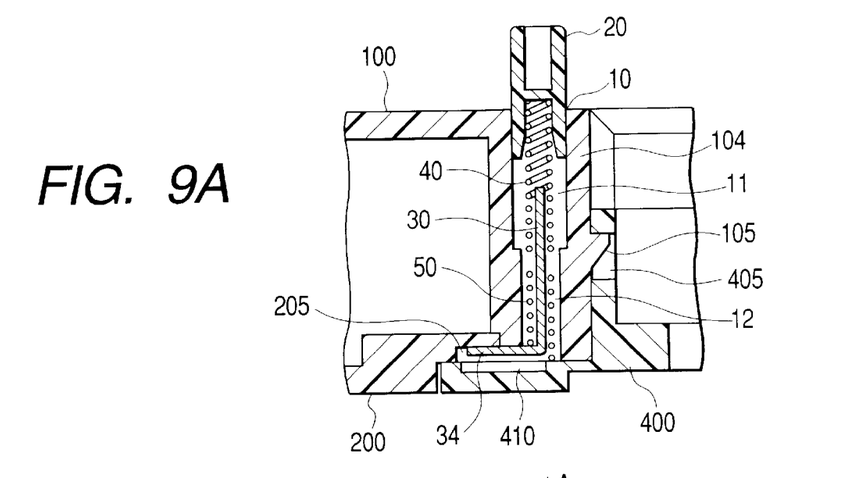
FIGS. 9A to 9C are diagrams for explaining the operation of the operating part and the locking key.
Figure 9B:
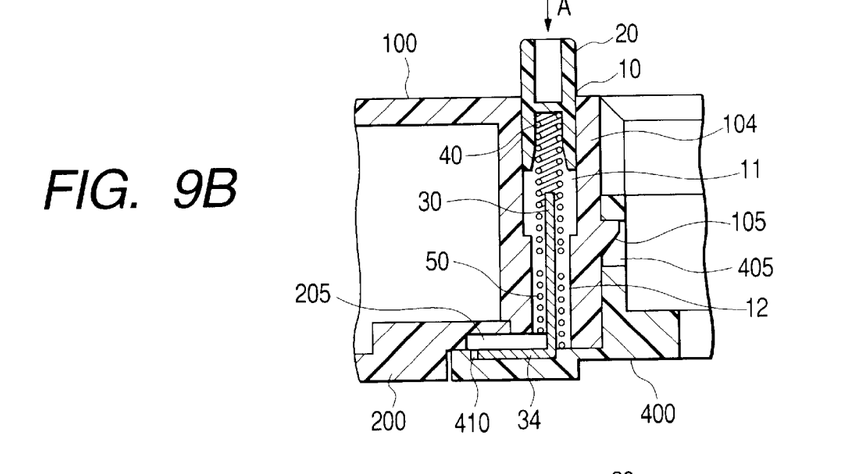
Figure 9C:
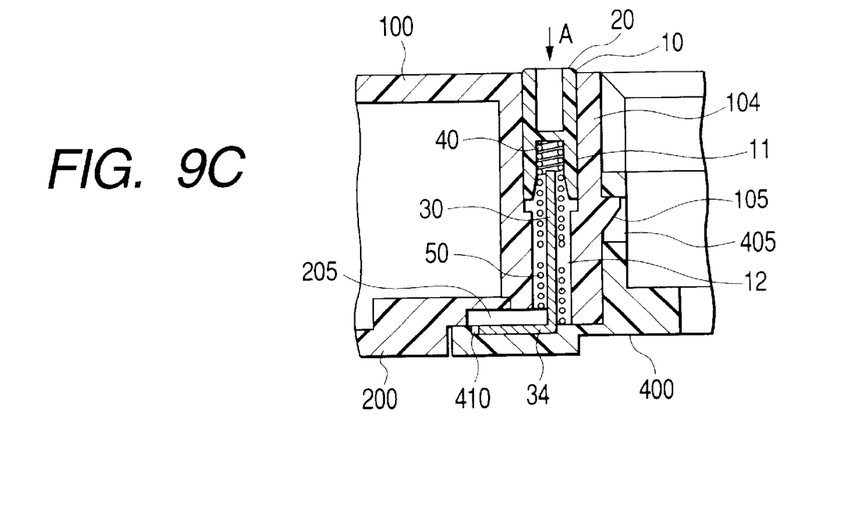

On e embodiment of a rotary connector according to the invention will now be described with reference to FIGS. 1 to 9. FIG. 1 is a plan view of the rotary connector according to the embodiment, FIG. 2 is a sectional view of the rotary connector, taken along the line 2—2 of FIG. 1, FIG. 3 is a sectional view of the rotary connector taken along the line 3—3 of FIG. 1, FIG. 4 is a front view of the operating part, FIG. 5 is a sectional view of the operating part, taken along the line 5—5 of FIG. 4, FIG. 6 is a plan view of the operating part seen from the direction of an arrow 6 of FIG. 4, FIG. 7 is a side view of the locking key, FIG. 8 is a front view of the locking key, and FIGS. 9A to 9C are diagrams for explaining the operation of the operating part and the locking key. In these drawings, the members or parts corresponding to the members or the parts shown in FIGS. 10 and 11 are designated by the same reference numerals.

As shown in FIGS. 1 and 2, the rotary connector of the invention is the same as the rotary connector of the prior art shown in FIGS. 10 and 11 in the basic configuration. The rotary connector includes a movable housing 100, a stationary housing 200 concentrically assembled to the movable housing 100, a rotor snap 400 snap-joined to the movable housing to rotatably hold the stationary housing 200, and a flexible cable 300 stored in an annular cable storing part 111 formed by integral combination of the above respective members 100, 200, 400.

The rotary connector of the invention is characterized in that the locking mechanism provided between the movable housing 100 and the stationary housing 200 is, as shown in FIGS. 1, 3 and 9, constituted of a guide hole 10 bored in the movable housing 100, an operating part 20 and a locking key 30 slidably stored in the guide hole 10, a rotor snap 400 disposed opposite to the locking key 30, a first spring member 40 set between the operating part 20 and the locking key 30, a second spring member 50 set between the locking key 30 and the rotor snap 400, and a key engaging recessed part 205 formed in the stationary housing 200.

The operating part 20 is, as shown in FIGS. 4 to 6, constituted of a cylindrical shaft part 21, an elastic deforming part 22 projected from the lower end part of the shaft part 21, a locking claw 23 formed on the outside of the tip of the elastic deforming part 22, a spring bearing part 24 provided on the lower end part of the shaft part 21, and a spring presser 25 formed in the direction intersecting perpendicularly to the forming part of the elastic deforming part 22 to cover the periphery of the spring bearing part 24. The operating part 20 can be formed of an arbitrary material having a required strength, and especially preferably it is formed of resin material because of easiness of molding.

The locking key 30 is, as shown in FIGS. 7 and 8, constituted of a main part 31 formed substantially T-shaped, a first spring peg part 32 projected upward from the center of the upper end part of the main part 31, second spring peg parts 33 projected downward from both right and left end parts of the main part 31, and a locking part 34 formed by vertically bending the lower end part of the main part 31. The locking key 30 can be formed of an arbitrary material having a required rigidity, and especially preferably it is formed of a metal material such as iron, aluminum because the metal material has high rigidity and is easily molded.

The guide hole 10 is, as shown in FIGS. 3 and 9, constituted of a first storing part 11 for slidably storing the operating part 20, and a second storing part 12 for slidably storing the locking key 30, a first engaging part 13 for preventing disconnection of the operating part 20 is formed on the upper end part of the first storing part 11, and a second engaging part 14 for regulating the moving range of the locking key 30 is formed in a boundary area between the first storing part 11 and the second storing part 12.

The operating part 20 is inserted from the top plate 103 side of the movable housing 100 into the first storing part 11 of the guide hole 10. That is, when the operating part 20 is pressed to the top plate 103 side with the shaft part 21, the elastic deforming part 22, the locking claw 23 and the spring presser 25 of the operating part 20 conforming to the respective parts of the guide hole 10, the elastic deforming part 22 is elastically deformed to force the lower end part of the operating part 20 into the guide hole 10, and the moment the locking claw 23 goes over the first engaging part 13, the lower end part of the shaft part 21 including the elastic deforming part 22, the locking claw 23 and the spring presser 25 is stored in the first storing part 11. After that, the elastic deforming part 22 is restored to the no-load state, and the set interval of the locking claw 23 becomes larger than the width of the guide hole 10 bored in the top plate 103, so that the locking claw 23 engages with the first engaging part 13 to prevent the operating part 20 from falling off the first storing part 11.

On the other hand, the locking key 30 is inserted from the lower end side of the first inner cylinder 104 into the second storing part 12 of the guide hole 10. At this time, the first spring 40 is set between the spring bearing part 24 formed on the operating part 20 and the first spring peg part 32 formed on the locking key 30. After the locking key 30 is stored, the second spring member 50 is inserted from the lower end side of the inner cylinder 104 into the second storing part 12 of the guide hole 10, and one end thereof is mounted on the second spring peg part 33 formed on the locking key 30. The other end of the second spring member 50 is, as shown in FIGS. 2 and 9, held by the rotor snap 400. In this case, illustration being omitted, it is preferable that the rotor snap 400 is also provided with a spring peg part formed for restraining rocking of the second spring member 50. A recessed part 410 for retreating the locking part 34 is, as shown in the drawings, formed on a portion of the rotor snap 400 opposite to the locking key 30.

Preferably the spring constant of the first spring member 40 is adjusted to a value larger than the spring constant (the total spring constant of two second spring members 50) of the second spring member 50 in order to surely operate the locking key 30.

The operation of the rotary connector of the present embodiment will now be described with reference to FIG. 9.

At the time of shipping, the position in the rotating direction of the movable housing 100 to the stationary housing 200 is adjusted to the neutral position, and as shown in FIG. 9A, the locking part 34 of the locking key 30 is engaged with the key locking part 205 formed on the stationary housing 200 to prevent the movable housing 100 from shifting from the neutral position.

The rotary connector is mounted on the steering shaft 700 (See FIG. 10), and the stationary housing 200 of the rotary connector is fixed to the steering column 701 (See FIG. 10). After that, when the steering wheel 702 (See FIG. 10) is mounted on the tip of the steering shaft 700, the operating part 20 is pressed in the direction of an arrow A by the steering wheel hub 703 (See FIG. 10). By the pressing force of the operating part 20, the first spring member 40 and the second spring member 50 are compressed, whereby as shown in FIG. 9B, the locking key 30 is lowered so that the tip of the locking part 34 abuts on the base of the recessed part 410 formed in the rotor snap 400. Thus, the engagement of the locking key 30 with the key engaging recessed part 205 formed in the stationary housing 200 is released so that the movable housing 100 can be rotated relatively to the stationary housing 200.

When the operating part 20 is further pressed in the direction of an arrow A in such a condition, since the tip of the locking part 34 abuts on the base of the recessed part 410 formed in the rotor snap 400, the second spring member 50 is not compressed any more, and as shown in FIG. 9C, only the first spring member 40 is compressed so that the operating part 20 is independently lowered to be inserted in the guide hole 10 for the pushing amount of the steering wheel hub 703.

In the rotary connector of the present embodiment, as described above, when the operating part 20 is pressed, the locking key 30 abuts on the rotor snap 400 to prevent the locking key 30 from being projected to the outside, whereby the need of dead space between the rotary connector and other vehicle-mounted parts is eliminated, and designing for the periphery of the steering device in an automobile can be facilitated. Since the locking key 30 is not projected, the locking key 30 will not abut on other vehicle-mounted parts to prevent the disadvantage such as generation of abnormal sound. After the locking key 30 abuts on the rotor snap 400, the operating part 20 is independently forced into the guide hole 10 against the elastic force of the first spring member 40, so that setting errors of the rotary connector and the steering wheel to the steering shaft can be absorbed by the elastic deformation of the first spring member 40 not to cause any special problem.

In addition, according to the present embodiment, the rotary connector is so constructed that the elastic deforming part 22 and the locking claw 23 are formed on the operating part 20, and the operating part 20 can be inserted from the top plate 103 side of the movable housing 100 into the first storing part 11 of the guide hole 10, whereby assembling of the operating part 20 to the movable housing 100 can be facilitated. Further, the rotary connector of the present embodiment uses the rotor snap 400 rotatably connecting the movable housing 100 and the stationary housing 200 as the stopper for the locking key 30 and the second spring member 50, whereby the constitution of the rotary connector can be more simplified as compared with the case of separately providing the stopper so as to reduce the size and cost of the rotary connector.

The reference numeral 60 in FIG. 2 designates a mover for reversing the winding direction of the flexible cable 300. The mover 60 is formed by an annular holder 61 rotatably stored in the cable storing part 111, and one to plural rollers 62 rotatably mounted on the roller holder 61. The winding direction of the flexible cable 300 in the cable storing part 111 can be reversed by wrapping the flexible cable 300 round the roller 62 for a semicircle only, whereby the flexible cable 300 stored in the cable storing part 111 can be shortened.

The reference numeral 70 in FIG. 2 designates a lead block connected to both ends of the flexible cable 300. The lead block 70 is formed by integrating plural terminals with insulating resin and set in the first conductor lead-through part 102 formed in the movable housing 100 and the second conductor lead-through part 202 formed in the stationary housing 200. The conductors provided in the flexible cable 300 are individually connected to the respective ends of the plural terminals. An external connector not shown is connected to the respective other ends of the plural terminals. Thus, the electric parts provided on the steering column side and the electric parts provided on the handle side are electrically connected through the flexible cable 300.

Though the description of the embodiment deals with the case of the rotary connector including the movable housing 100 having the disc-like top plate 103 with the center hole 101 and the first inner cylinder 104 suspended from the inner peripheral edge of the top plate 103 as well as the stationary housing 200 having the base plate 203 with the center hole 201 penetrating the first inner cylinder 104 and the outer cylinder 204 raised from the outer peripheral edge of the base plate 203, the constitution of the movable housing 100 and the stationary housing 200 is not restrictive, and applied to the rotary connector having arbitrary known movable housing and stationary housing.

Though the rotor snap 400 rotatably connecting the movable housing 100 and the stationary housing 200 is used as the member for bearing the locking key 30 and the second spring member 50 in the above embodiment, the gist of the invention is not limited to that, and an arbitrary stopper may be provided instead of it in the rotary connector not having the rotor snap 400.

According to the invention, the rotary connector is constructed so that when the operating part is pressed, the locking key abuts on the stopper to prevent the locking key from projecting to the outside, whereby the need of providing dead space between the rotary connector and other vehicle-mounted parts can be eliminated so as to facilitate designing the periphery of the steering device in an automobile. Being not projected, the locking key will not abut on other vehicle-mounted parts so as to prevent the disadvantage such as generation of abnormal sound. Further, after the locking key abuts on the stopper, the operating part is independently forced into the guide hole against the elastic force of the first spring member so that setting errors of the rotary connector and the steering wheel to the steering shaft can be absorbed by the elastic deformation of the first spring member so as to prevent a special problem due to a fitting error.

What is claimed is:

1. A rotary connector, comprising:

movable and stationary housings disposed concentrically and connected to be relatively rotatable;

a flexible cable stored to be wound and unwound in an annular cable storing part formed between the two housings; and a locking mechanism provided between the movable and stationary housings, wherein the locking mechanism comprises a guide hole bored in the movable housing, an operating part slidably stored in the guide hole, a part of which is projected from a first open end of the guide hole to the outside, a locking key slidably stored in the guide hole, a part of which is projected from a second open end of the guide hole to the outside, a stopper disposed opposite to the locking key, a first spring member set between the operating part and the locking key, a second spring member set between the locking key and the stopper, and a key engaging part with which the locking key provided on the stationary housing is removably engaged, and when the operating part is forced into the guide hole, the locking key is subjected to external force corresponding to a difference between the elastic force of the first spring member and the elastic force of the second spring member and moved to the stopper side, thereby releasing the engagement of the locking key with the key engaging part, and after the locking key is forced to abut on the stopper, only the first spring member is elastically deformed to force the operating part into the guide hole.

2. The rotary connector according to claim 1, wherein the movable housing to be used includes a disc-like top plate having a center hole, and an inner cylinder suspended from an inner peripheral edge of the top plate, the stationary housing to be used includes a base plate having a center hole penetrating the inner cylinder and an outer cylinder raised from an outer peripheral edge of the base plate, the inner cylinder is provided with the guide hole penetrating from a tip thereof to a surface of the top plate, and the key engaging part is formed on the base plate.

3. The rotary connector according to claim 1, wherein as the stopper, used is a rotor snap rotatably connecting the movable and stationary housings to each other.

* * * * *